(12) United States Patent
Zentmyer

(10) Patent No.: US 6,269,712 B1
(45) Date of Patent: Aug. 7, 2001

(54) AUTOMOTIVE FULL LOCKING DIFFERENTIAL

(76) Inventor: John Zentmyer, P.O. Box 11954, Costa Mesa, CA (US) 92627

( * ) Notice: Subject to any disclaimer, the term of this patent is extended or adjusted under 35 U.S.C. 154(b) by 0 days.

(21) Appl. No.: 09/493,547

(22) Filed: Jan. 28, 2000

(51) Int. Cl.⁷ .................................................... F16D 27/12
(52) U.S. Cl. .............................................................. 74/650
(58) Field of Search ............................................... 74/650

(56) References Cited

U.S. PATENT DOCUMENTS 4,643,284 * 2/1987 Hardt et al. .............................. 74/650
5,971,123 * 10/1999 Ochab et al. ........................... 74/650
6,176,359 * 1/2001 Krisher ................................... 74/650

* cited by examiner

Primary Examiner—Dirk Wright
(74) Attorney, Agent, or Firm—The Maxham Firm

(57) ABSTRACT

A full-locking differential drive mechanism, comprised of an input drive which is composed of a pair of opposed spaced drive races, each having an inner diameter, a coupling block disposed between the races for coupling them to drive together, output driven means comprising a pair of co-axially disposed coupler members, each having an outer diameter disposed within the drive races inner diameters, which produces a bi-directional roller clutch disposed between the inner diameters and the outer diameters and operative to couple the drive races to the coupler members enabling driving engagement therebetween.

21 Claims, 3 Drawing Sheets

AUTOMOTIVE FULL LOCKING DIFFERENTIAL

BACKGROUND OF THE INVENTION

The present invention relates to the field of differentials for vehicle drive trains and pertains particularly to positively locking differentials for motor vehicles.

Land vehicles, such as automobiles, trucks, buses and the like, typically utilize what has become known as an open differential for the final drive system. An automotive differential is a mechanical assembly, often a system of gears, which is located in the driving axle of a vehicle. It applies power to the wheels while at the same time allowing a difference in their rotational speeds; this difference occurs when the vehicle turns because the outside wheel rotates faster than the inside wheel due to its larger turning radius. Differentials accomplish this function in various ways, depending on their particular designs.

Differentials go back to the beginnings of the automotive era, but many of them had major traction problems in difficult terrain. Differentials have evolved into two broad classes: (1) Standard, or "open" differentials, and (2) Traction-adding differentials. Open differentials are by far the most common because they are inexpensive and do a good job for the majority of vehicles on the highway. However, open differentials have one major drawback: They can provide only limited power in marginal traction situations. To overcome this drawback, mechanical traction-adding differentials have been developed. These types of differentials are divided into two classes: (1) Limited Slip differentials, and (2) Locking differentials. Limited slip differentials are furler divided into two general classes: (1) Clutch type and (2) Gear type. Locking differentials also are further divided into two general classes: (1) Automatic and (2) Manual (activated by the driver). This invention is concerned primarily with automatic locking differentials, since they are the most widely used lockers and exist in a variety of designs. Other types of traction-enhancing devices and systems also have been developed, notably viscous coupling differentials and electronic traction control (ETC); however, these and other exotic designs are not mechanical lockers. Many designs have been tried over the years to overcome these traction problems, and some were produced either as factory-installed units or as after-market devices. While many of them have been satisfactory in many respects, they also have some drawbacks. Among these drawbacks are complexity, lack of reliability, cost, and adverse vehicle handling characteristics. Thus, a need exists for a simple, inexpensive, reliable and effective locking differential.

DEFINITION OF TERMS

Differential Carrier: Sometimes used interchangeably with the term differential case, the correct description of the differential carrier is that it is the housing in which the drive pinion, ring gear, and differential case are installed, and it is a part of the axle housing assembly. Thus, it holds, or carries, the differential case assembly and is therefore called the carrier. It may be an integral design in which it also supports the axle tubes, or it may be a drop-out design in which it is removable from the vehicle as the complete differential and carrier assembly.

Differential Case: Sometimes used interchangeably with the term differential carrier, the correct description of the differential case is that it is the round housing to which the ring gear is bolted and which contains the differential gear assembly. It is assembled into the differential carrier, and is not visible from the outside.

Locker. A Locker is an automotive differential that can provide up to 100% of the incoming power to either wheel yet also allow differentiation in a turn. One comment on terminology: The terms "locker" and "locking differential" have incorrectly been frequently used interchangeably with "limited slip" differential over the years. A limited-slip differential is generally a friction- or binding-type of design that is capable of providing only a limited amount of power to each wheel when the other one has lost traction. A full-locking differential, or "locker," however, can provide up to 100% of the available power to either wheel even if the other one is off the ground or if an axle shaft is broken. Thus, the terms "locker" and "locking" properly refer only to full-locking (100%) types of designs.

SUMMARY AND OBJECTS OF THE INVENTION

It is the primary object of the present invention to provide a locking differential that is simple, effective and smooth in its operation.

In accordance with a primary aspect of the invention, a full-locking differential drive mechanism, comprised of an input drive means which is composed of a pair of opposed spaced drive races, each having an inner diameter, a coupling block disposed between said races and including coupling means for coupling them to drive together, output driven means comprising a pair of co-axially disposed coupler members, each having an outer diameter disposed within said drive races inner diameters, and a roller assembly disposed between said inner diameters and said outer diameters and operative to couple said drive races to said coupler members, thus producing a bi-directional over-running roller clutch.

BRIEF DESCRIPTION OF THE PREFERRED EMBODIMENTS

The above and other objects and advantages of the present invention will become apparent from the following description when read in conjunction with the accompanying drawings wherein.

DETAILED DESCRIPTION OF THE PREFERRED EMBODIMENTS

Figure 1:
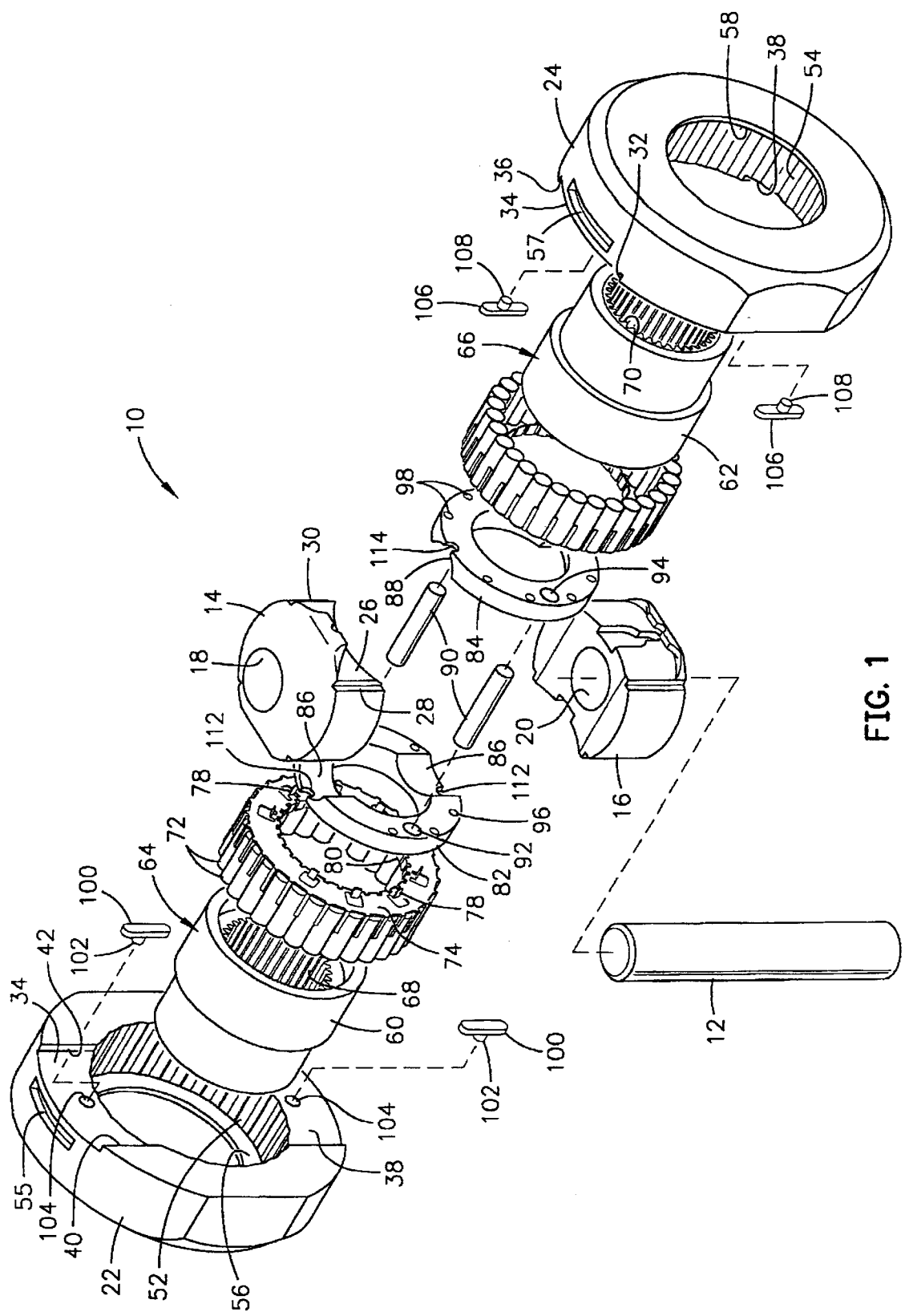
FIG. 1 is a perspective exploded view of an exemplary preferred embodiment of a differential in accordance with the invention.
Figure 2:
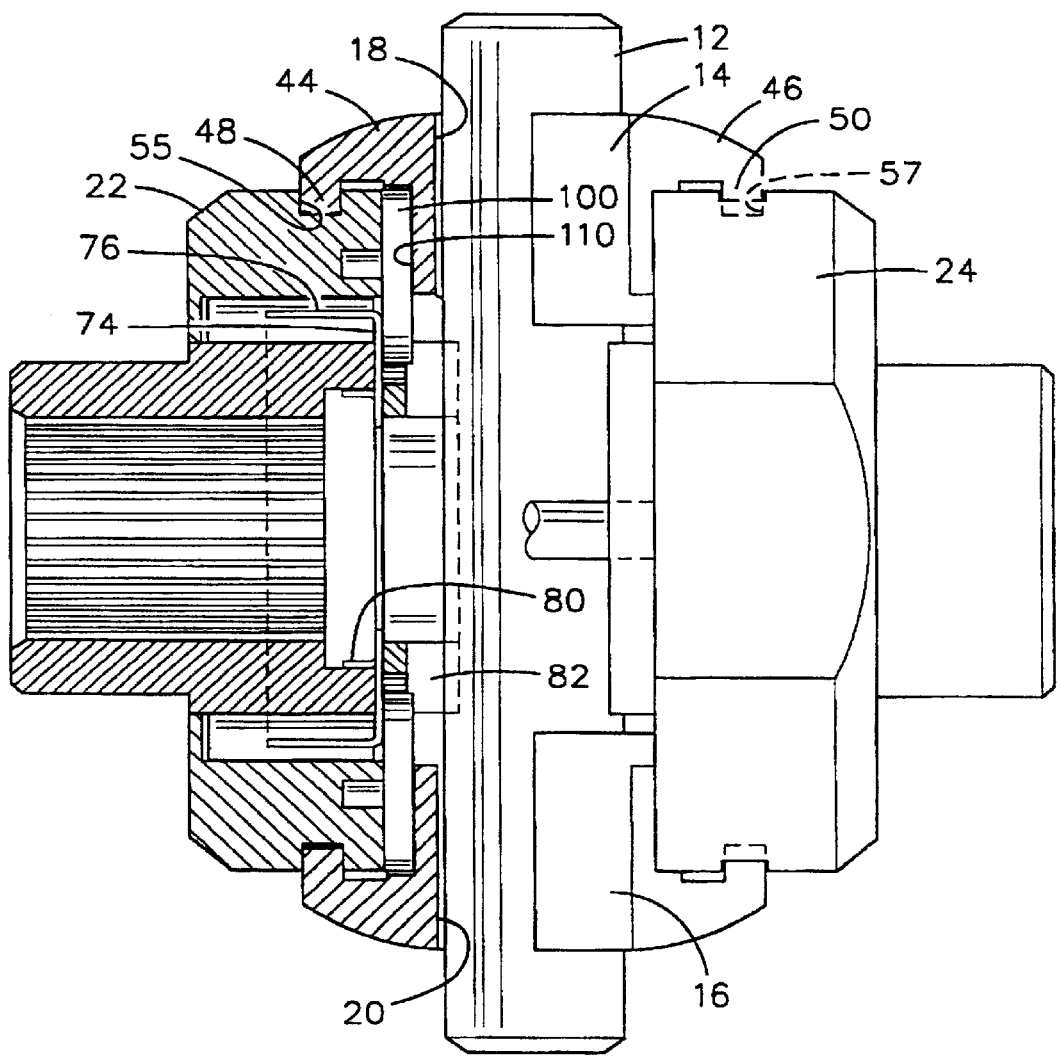
FIG. 2 is a front elevation view of the assembled differential partially in section.

Referring to the drawings, particularly to FIG. 1, an exemplary embodiment of a full-locking differential in accordance with the invention is illustrated in an exploded view and designated generally by the numeral 10. The illustrated differential is designed to be a full-locking differential and that replaces the standard automotive differential and which is user-installable into the existing differential case with no modifications. This unit gives the vehicle in which it is installed greatly increased traction.

The differential is comprised of two bi-directional over-running clutches disposed between an input and an output that provide 100% locking in each direction yet which also allow turning. The differential is designed to fit within the standard differential case and utilizes the standard pinion shaft mounted in the case as the drive input. The shaft 12 extends through bores in the case (not shown) and connects to two drive blocks 14 and 16 via large bores 18 and 20 in the drive blocks. The drive blocks have a somewhat generally rectangular central body portion with rounded or semi-cylindrical ends and a semispherical top to fit into the position of the original pinion gears. The drive blocks 14 and 16, each of which have various projections, grooves and slots, connect the shaft to two spaced apart annular drive races 22 and 24.

The drive blocks are identical and only one, 14 will be described in detail. Each side of the drive block is formed with a flat generally rectangular drive coupling member, only one of which 26, is clearly shown. The coupling member 26 is formed with driving shoulders 28 and 30 and is adapted to fit into a driving slot 34 in the inner face of drive race 24 and drivingly engage shoulders 32 and 36. A similar coupling member, not shown, on the other side of drive block 14 is adapted to fit into drive slot 34 and has shoulders, not shown, for drivingly engaging shoulders 40 and 42 formed by slot 34. The drive coupling members are preferably slightly shorter in length than the drive coupling slots to enable the drive blocks to move relative to the drive races in order to move a control plate as will be described. The drive block is formed with a pair of hook like structures on each side comprising an outwardly extending arm 44 and 46, each with a downwardly depending finger 48 and 50. The fingers 48 and 50 extend downward into slots 55 and 57 formed in the outer surface of the races 22 and 24. This couples and ties the two races together axially and thereby keeps them from spreading apart. The drive blocks are disposed in the recesses 34 and 38, disposed one hundred eighty degrees apart in drive race 22 and in like recesses 34 and 38 in drive race 24. The drive blocks are formed with outwardly extending arms which have downwardly depending lugs which extend into slots in the outer surfaces of the drive races to retain them laterally.

The drive races 22 and 24 are identical and only one 22, will be described in detail. The races have a generally annular or torroidal configuration with a generally square or rectangular cross sectional configuration. The drive races 22 and 24 are each formed with an inner generally cylindrical central bore or diameter 52 and 54, each with an end wall 56 and 58. The central bore is generally cylindrical formed with a plurality of small radius scalloped surfaces separated by flats forming a plurality of ramps to be engaged by clutch rollers as will be described. The recesses are formed for receiving clutch rollers and ramps for forcing the rollers into driving engagement with cylindrical drive surfaces on an output coupling as will be explained. Said rollers may be completely cylindrical or have appropriate flats thereon as defined by the designs of the drive race and coupler. The scalloped surfaces ramps are formed with an angle of about seven degrees between the flats and the cylindrical surface of the drive couplers. In a preferred embodiment, there are about thirty of the scalloped surfaces for a like number of rollers. This provides a high number of rollers to carry the load or torque of the drive train.

Figure 3:
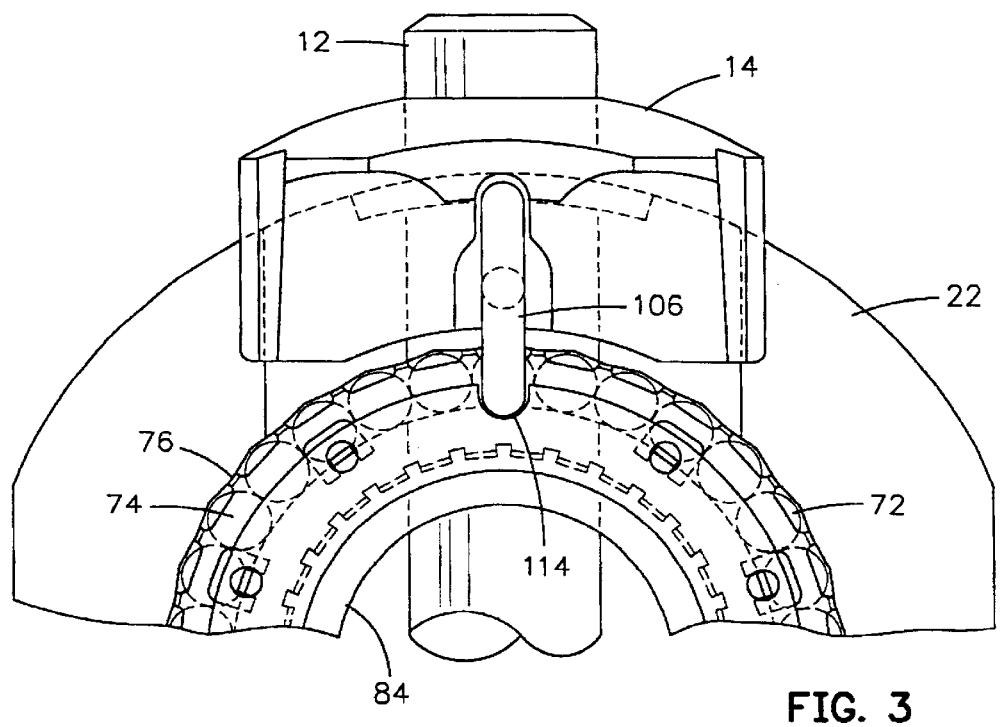
FIG. 3 is a partial side elevation view of the assembled differential of FIG. 1 shown at rest.
Figure 4:
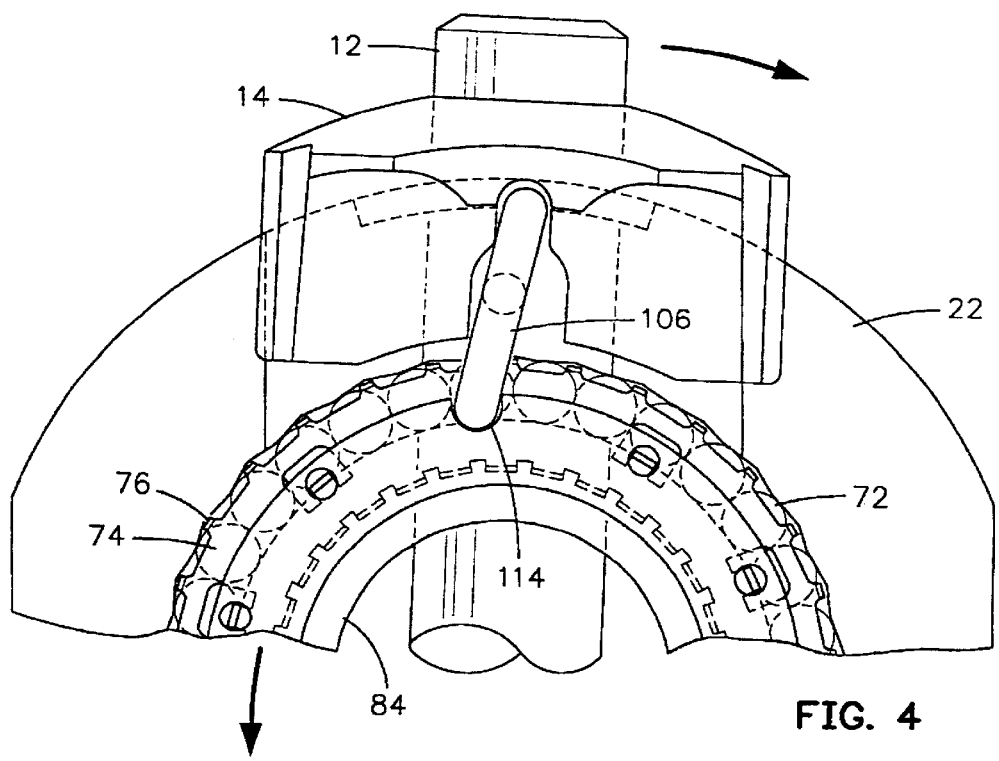
FIG. 4 is a view like FIG. 3 with the differential in driving condition.

A pair of tubular drive couplings or couplers 60 and 62 are disposed co-axially and concentric with races 22 and 24 and have outer stepped cylindrical diameters. A cylindrical clutch surface 64 and 66 is formed on each coupling, which surface is disposed within the bores of the drive races, and on which the clutch rollers are positioned. The couplers are tubular and have splined bores 68 and 70 for receiving and coupling to vehicle axles (not shown) to be driven thereby. A plurality of clutch rollers 72 is mounted within the space between the central bore 52 of the drive race and the coupling clutch surface 64. The spacing between the bores of the drive races and the cylindrical clutch surfaces of the drive couplers is greater than the diameter of the clutch rollers in the center of the scallops or arcs (FIG. 3), but less at the outer areas and the flats. Thus, the end areas of the arcs form ramps or cams which cam the rollers into driving engagement with the cylindrical clutch surfaces when certain relative rotation between the drive races and drive couplers occurs (FIG. 4).

A thin annular control plate 74 having fingers 76 extending axially outward from one side is positioned on an inner end of the drive couplings with the fingers extending between the rollers 72. A plurality of tabs 78 extend axially from the other surface of the control plate to extend into and thereby couple into a pair of spacer plates disposed between the ends of the drive couplings. The control plates move with the spacer plates to control the position of the rollers in the annular space between the drive races and drive couplings. The control plate is also provided with fingers 80 at its inner diameter which extend into and frictionally engage the inner bore or diameter of the drive couplings.

A pair of annular spacer plates 82 and 84 is disposed on opposite sides of the pinion shaft between the pinion shaft and the drive races and at the inner ends of the drive couplings. The spacer plates have semi-cylindrical surfaces 86 and 88 that clear opposite sides of the pinion shaft, and they are coupled together by a pair of rods or shafts 90 disposed on opposite sides of the pinion shaft and engaging bores 92 and 94 in the sides of the plates. The plates are also formed with a plurality of bores 96 and 98 around the circumference thereof for receiving the tabs 78 of the control plates.

A pair of transfer levers 100 is disposed between each drive block and drive race and include a pivot shaft 102 that extends into a bore 104 in the inside surface of each drive race 22. A similar pair of levers 106 have pivot shafts 108 that mount in holes (not shown) in race 24. The lever 100 has an outer end that extends into a slot 110 in the drive block 14 and an inner end that extends into a slot 112 in the outer diameter or surface of the spacer plate 82. The transfer levers 106 similarly extend into slots (not shown) in race 24 and slot 114 in spacer 84. This couples the drive blocks and spacers to move in opposite directions when the drive blocks move relative to the drive races and moves the control plate to move the clutch rollers into and out of driving position. The dimensions of driving member 26 and slot 34 along with the dimensions of transfer lever 100 assure that all rollers are moved simultaneously into driving position prior to the application of power.

This combination of structures described provides characteristics which results in a unit that is easy to drive yet one which also gives the vehicle in which it is installed the maximum traction available. Because of its smoothness and low dynamic backlash, it has a minimum of the well-known locker handling characteristics Also, because all its internal forces are at right angles to the axle shafts, resulting in no side load, the existing differential case is effectively stronger than with other user-installable lockers.

In summary, the present invention is comprised of left and right halves that are driven by the pinion shaft. On the shaft are mounted two parts which the inventor calls drive blocks. These parts drivingly mate with two other parts, which he calls drive races, which are mounted left and right of the pinion shaft. Each drive race has an inner surface that receives inter-connecting elements, which are identical precisely-made parts which the inventor calls clutch rollers. In each side are 30 of these rollers that also are in contact with the coupler and which are held in position by spring pressure from the control plate. The coupler is splined and connected to the axle shaft, and a C-Clip for retaining the axle shaft (if used) may be located in a slot or recess in the coupler. Next is the spacer, which is connected to the control plate and which is located between the plate and the pinion shaft. Between the left and right spacers are two connecting pins, which connect the spacers together to communicate relative position. Between the drive blocks and spacers are transfer levers, which rotate the spacers to move the control plates and thereby properly position the rollers. The large number of rollers compared to the diameter of the driven member (the coupler, at about two inches) significantly reduces the "Hertz stresses" (surface pressures) in the mating parts, thereby increasing product reliability.

Operation. As shown in FIG. 3, when the differential is at rest the transfer levers are centered and the fingers of the control plate are centered between the clutch rollers. The rollers are in the larger space between the drive races and the clutch surfaces of the couplers. As the pinion shaft starts to rotate, as shown in FIG. 4, the shoulders of the drive blocks begin to move into contact with the shoulders of the drive races. At the same time, the transfer levers rotate the spacers, moving the control plate to position the rollers from the neutral position to a drive position on the ramps. When the drive races are contacted by the drive blocks and then start to rotate, the rollers are wedged between them and the couplers such that the couplers are tightly "grabbed" (friction coupled) and thereby are rotated along with the drive races to move the vehicle. When the vehicle starts to turn, the outside coupler begins to rotate faster than the inner one. This movement pushes or "rolls" the rollers on that side slightly away from the ramps in the drive race, against control plate spring pressure, allowing the coupler to rotate quite freely as long as the vehicle is turning. As the vehicle straightens out, the rollers again wedge back in between the drive race and coupler with almost no relative engagement motion (¼-degree or less), and the unit again locks up. This action occurs both in forward and reverse and in right and left turns.

While my invention has been illustrated and described by means of a particular embodiment, it is to be understood that numerous changes and modifications may be made therein without departing from the spirit and the scope thereof as defined in the appended claims.

I claim:

1. A full-locking differential drive mechanism, comprising:
   input drive means comprising a pair of opposed spaced drive races, each having an inner generally cylindrical bore with a plurality of recesses;
   a coupling block disposed between said races for coupling them to drive together;
   output driven means comprising a pair of co-axially disposed coupler members, each having an outer cylindrical surface disposed within said drive races inner diameters; and
   a plurality of transmitting elements, or rollers, disposed in said recesses between said inner generally cylindrical bore and said outer cylindrical surface defining a bi-directional over-running roller clutch, coupling said drive races to said coupler members.

2. A differential mechanism according to claim 1 wherein said bi-directional roller clutch includes a control plate having fingers extending between pairs of said rollers and operative to urge said rollers into driving engagement when an input drive is applied to said drive block.

3. A differential mechanism according to claim 2 wherein said drive block is operatively connected to said control plate to shift said fingers into engagement with said rollers.

4. A differential mechanism according to claim 3 wherein said drive block has a lost motion connection to said races and a transfer lever connected to said control plate.

5. A differential mechanism according to claim 1 wherein said bi-directional roller clutch comprises a control plate adjacent to each coupler, each control plate having a plurality of fingers for engaging and moving said rollers.

6. A differential mechanism according to claim 5 wherein said drive block is operatively connected to said control plate to shift said fingers into engagement with said rollers.

7. A differential mechanism according to claim 1 wherein:
   said clutch comprises a pair of annular control plates between said coupler members; and
   a transfer lever connected between said drive block and said control plates.

8. A differential mechanism according to claim 7 wherein said control plates include fingers extending adjacent to and operative to urge said rollers into driving engagement in response to a drive input.

9. A differential mechanism according to claim 8 wherein said drive block is connected to said races by a lost motion connection.

10. A differential mechanism according to claim 9 wherein said a lost motion connection comprises a generally rectangular lug on a side of said drive block and a generally rectangular recess on a side of said drive race engaged by said lug.

11. A full-locking differential drive mechanism adapted to fit into a standard differential case, comprising:
    input drive means comprising a pair of opposed spaced drive races positioned on each side of a pinion shaft, each having a central bore;
    said central bore of each race formed with a plurality of symmetrical recesses;
    at least one drive slot in an opposed face of each of said drive races;
    a coupling block adapted to mount on said pinion shaft and engage said drive slots between said races for coupling said races to drive together;
    output driven means comprising a pair of co-axially disposed coupler members, each having an outer diameter disposed within said drive races central bores, and having an inner diameter for coupling to a drive shaft; and
    a plurality of free clutch rollers in said recesses defining a bi-directional clutch between said inner diameters and said outer diameters and operative to couple the drive races to the coupler members; and
    a control plate operatively connected to said drive block and having fingers extending between said rollers for controlling the engagement and disengagement of said clutch rollers.

12. A differential mechanism according to claim 11 wherein said drive block is operatively connected to said control plate to shift said fingers into engagement with said rollers.

13. A differential mechanism according to claim 12 wherein said drive block is connected to the annular control plate by a transfer lever connected between said drive block and said control plates.

14. A differential mechanism according to claim 12 wherein said drive block is connected to said races by a lost motion connection.

15. A differential mechanism according to claim 13 wherein said a lost motion connection comprises a generally rectangular lug on a side of said drive block and a generally rectangular recess on a side of said drive race engaged by said lug.

16. A differential mechanism according to claim 11 wherein said control plate includes friction fingers engaging said inner bore.

17. A full-locking differential drive mechanism adapted to fit into a standard differential case, comprising:

input drive means comprising a pair of opposed spaced drive races positioned on each side of a pinion shaft, each having a central bore;

said central bore of each race formed with a plurality of synmmetrical recesses;

at least one drive slot in an opposed face of each of said drive races; a coupling block adapted to mount on said pinion shaft and having a drive lug on each side thereof to engage said drive slots between said races for coupling said races to drive together;

output driven means comprising a pair of co-axially disposed coupler members, each having an outer diameter disposed within said drive races central bores, and having an inner diameter for coupling to a drive shaft;

a plurality of free clutch rollers in said recesses defining a bi-directional clutch between said inner diameters and said outer diameters and operative to couple the drive races to the coupler members; and a control plate operatively connected by a transfer lever to said drive block and having friction fingers engaging said inner bore, and control fingers extending between said rollers for controlling the engagement and disengagement of said clutch rollers.

18. A differential mechanism according to claim 17 wherein said drive block is operative to move said control plate to shift said fingers into engagement with said rollers.

19. A differential mechanism according to claim 18 wherein said transfer lever connected to a spacer plate between said drive block and said control plates.

20. A differential mechanism according to claim 19 wherein said drive block is connected to said races by a lost motion connection.

21. A differential mechanism according to claim 20 wherein said a lost motion connection comprises a generally rectangular lug on a side of said drive block and a generally rectangular recess on a side of said drive race engaged by said lug.

* * * * *